United States Patent [19]

Berger

[11] Patent Number: 4,521,467

[45] Date of Patent: Jun. 4, 1985

[54] ULTRASONICALLY-SEALABLE PEELABLE SEAL

[75] Inventor: Kenneth R. Berger, Grapevine, Tex.

[73] Assignee: Frito-Lay, Inc., Dallas, Tex.

[21] Appl. No.: 560,120

[22] Filed: Dec. 12, 1983

[51] Int. Cl.³ .................. B32B 27/08; B65D 73/00
[52] U.S. Cl. ................................. 428/35; 428/36; 428/41; 428/43; 428/412; 428/475.8; 428/476.1; 428/479.6; 428/481; 428/483; 428/516; 428/518; 428/519; 428/520; 428/345; 206/631; 206/484
[58] Field of Search .................. 428/35, 36, 41, 43, 428/412, 475.8, 476.1, 479.6, 483, 481, 516–520

[56] References Cited

U.S. PATENT DOCUMENTS

| | | | |
|---|---|---|---|
| 4,252,846 | 2/1981 | Romesberg et al. | 428/35 |
| 4,361,237 | 11/1982 | Heiremans et al. | 428/35 |
| 4,430,288 | 2/1984 | Bonis | 428/35 |
| 4,444,828 | 4/1984 | Anthony et al. | 428/35 |
| 4,450,028 | 5/1984 | Vilutis | 428/36 |

Primary Examiner—Patricia C. Ives
Attorney, Agent, or Firm—Bernard, Rothwell & Brown

[57] ABSTRACT

A packaging material has a peelable seal and a sealing of resin which is ultrasonically-sealable, but not readily heat-sealable backed by a backing layer of resin having a higher melting point than the sealing layer. The interlayer adhesion between the backing layer and the sealing layer is below the strength required to break the sealing layer. The thickness and material of the sealing material is utilized to control the seal strength of the peelable end seal of the package.

17 Claims, 4 Drawing Figures

ULTRASONICALLY-SEALABLE PEELABLE SEAL

BACKGROUND OF THE INVENTION

1. Field of the Invention

This invention relates to improvements in peelable seals, particularly peelable seals such as those utilized in ultrasonically-sealable packaging materials and packages.

2. Prior Art

Peelable seals are known in the prior art for numerous advantages. Particularly such seals provide a means for opening a package by pulling on two layers of the package so that the package opens relatively easily and yet is of such strength that the package survives in the chain of distribution. The peelable seal allows a consumer to open the package, yet imparts sufficient strength to the package to be handled from manufacturer to user. Peelable seals allow a package to be made with a predetermined seal strength. The seal strength requirements usually vary according to the size of the package and the items contained in the package.

Film-type packaging material is commonly used for packaging snacks such as potato chips, corn chips, popcorn, and the like, as well as other numerous items. Such packaging is conventionally heat-sealed. Heat sealing, however, typically requires expensive packaging materials. Ultrasonic sealing is not readily commercially available, but is known in the art and can utilize less expensive packaging materials.

There is a need in the art for a peelable seal of less expensive packaging material which is ultrasonically sealable, but not readily heat-sealable.

SUMMARY OF THE INVENTION

This invention provides a laminated or coextruded plastic film package which utilizes less expensive material that is not readily heat-sealable, but is ultrasonically sealable. In other words, a peelable seal structure is produced in which the film resins used are easily ultrasonically-sealable at the high production line speeds of over 60 bags per minute contemplated for use in the production of ultrasonically-sealed packages, but are not readily heat-sealable at these speeds. A heat sealer simply cannot seal this sealant layer and produce a satisfactory hermetic seal that has no distortion or puckering and has the desired seal characteristics at these line speeds. Ultrasonic sealing of the film resins used does produce a satisfactory seal. Maintenance of a peelable seal function relies upon the weaker contacting layer at the seal rather than the layer adjacent it, so that one of the contacting layers tears and is isolated from the adjacent layer. Preferably, for a functional package, additional layers such as laminated, printed, or coextruded layers should be on the outside of the layer adjacent the contacting layer.

DETAILED DESCRIPTION OF THE PREFERRED EMBODIMENTS

Figure 1:
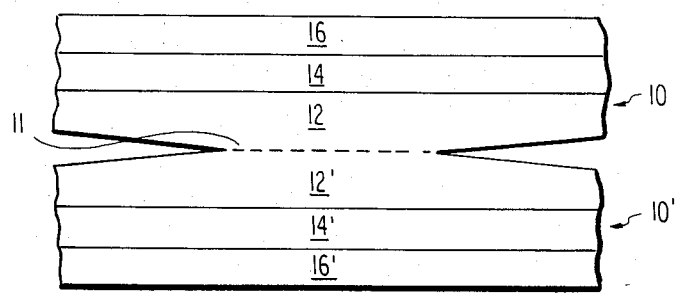
FIGS. 1-4 are schematic sectional views taken through the peelable seal of this invention to demonstrate the basic function and operation of peelable seals generally.

Referring to FIG. 1, there are generally indicated two packaging material films 10, 10' which are sealed together at seal interface 11 of the sealing layers 12, 12'. In the present invention this seal is an ultrasonic seal, not a heat seal. In addition to sealing layers 12, 12', the films are each comprised of a backing layer 14, 14' and preferably one or more outer laminated, printed or coextruded layers 16, 16'.

Figure 2:
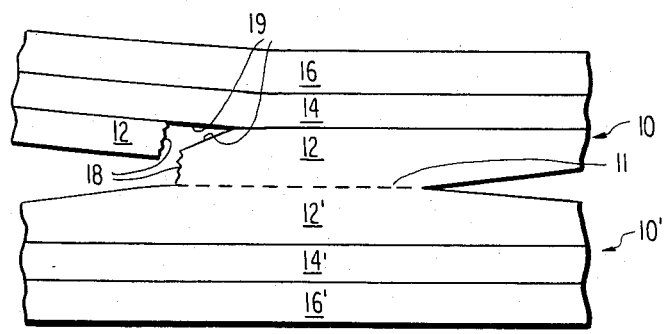
Figure 3:
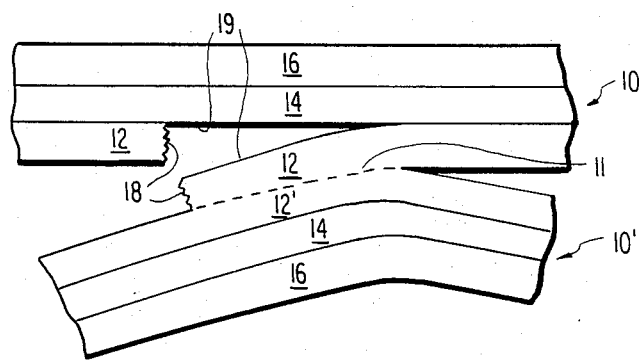

As shown in FIG. 2, when a pulling force is applied to one end of the film 10 the sealing layer 12 of the film 10 will tear at the first break point 18 of seal interface 11 and will begin to peel off at area 19 from the backing layer 14 of film 10. As the pulling force is continued to be applied, the sealing layer 12 of film 10 further peels off from backing layer 14 as shown in FIG. 3.

Figure 4:
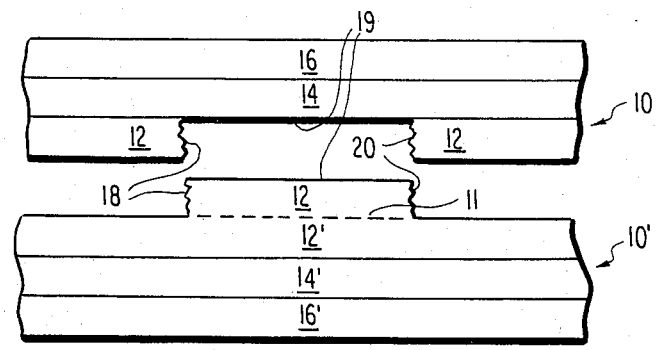

As shown in FIG. 4, the sealing layer 12 will peel off from backing layer 14 until the end of the seal interface 11 is reached at which occurs a second break point 20. When the second break point 20 is reached, the sealing layer 12 of film 10 will again tear at the seal interface 11, thus completely separating film 10 from film 10' at the seal interface 11.

As shown in FIGS. 1-4, there could also be additional outer layers 16, 16' such as laminated, printed or coextruded layers, but these are not critical to the sealing function and could be any combination of materials for other functions of the package which are shown in the following general examples.

The peelable seal of this invention is applicable to back-sealed, side-sealed or end-sealed packages which have been determined to require a peelable seal strength from 100 grams per inch to 700 grams per inch for small bag items and from 400 grams per inch to 1,800 grams per inch for large bag items (5 ounce sizes and greater). The greater the peelable seal strength the better the survival rate of the seal in distribution, but the more difficult the bag is to open. The measurement of the seal strength is accomplished by taking a one-inch strip of the seal and applying it to an instrument tester to determine the force at which the seal breaks.

In the present invention backing layers 14, 14' must comprise a higher melting point resin than sealing layers 12, 12'. Once sealing layer 12 is sealed to another sealing layer 12' as in an end seal, the thickness and material of sealing layers 12, 12' are used to control the seal strength of the end seal. As backing layers 14, 14' are not melted during the sealing operation they will not contribute to the seal strength of the material. The interlayer adhesion of backing layers 14, 14' and sealing layers 12, 12' must be below the strength required to tear or break the sealing layers 12, 12'.

The resin comprising the sealing layers 12, 12' is not easily heat-sealable, but can be ultrasonically sealed. Maintenance of the peelable seal function relies on the higher melt temperature resin of backing layers 14, 14' which isolates layers 12, 12' from the remainder of the structure.

The resins employed for sealing layers 12, 12' and backing layers 14, 14' for a particular seal are selected on the basis of their melting point. The resin chosen for sealing layers 12, 12' must have a melting point below that of backing layers 14, 14'.

Also, polymers may be made difficult to heat seal and therefore may be used for sealing layers 12, 12' by treating the polymer with such items as slip agents, jaw release chemicals or processing aids.

Examples of resins that may be used for backing layers 14, 14' are as follows: polyacrylonitrile, nylon (polyamide), polycarbonate, polyester, high density polyethylene (HDPE), medium density polyethylene (MDPE), ethylene copolymers (with propylene, vinyl acetate (EVA), ethyl acrylate, methyl acrylate, acrylic acid, or vinyl alcohol), polypropylene, polystyrene, poly vinylidene chloride (PVdC).

Examples of resins that may be used for sealing layers 12, 12' are as follows: ionomer resins, nylon (polyamide), polybutylene, polyester, high density polyethylene (HDPE), medium density polyethylene (MDPE), low density polyethylene (LDPE), ethylene copolymers (with propylene, vinyl acetate (EVA), ethyl acrylate, methyl acrylate, acrylic acid, or vinyl alcohol), polypropylene polystyrene.

Exemplary structures, including outer laminated, printed or coextruded layer 16 as a multicomponent layer are listed below:

```
       16             14   12
/Polypropylene/ink/LDPE/HDPE/Nylon/HDPE/

16                       14   12
Lacquer/Ink/Kraft Paper/Adhesive/Polyester/Polypropylene 16                           14   12
/Lacquer/Ink/EVA//White HDPE/Brown HDPE/Tie/Nylon/HDPE/

16    14    12
/HDPE/Tie/Nylon/Tie/HDPE/
```

The term "tie" as used in the foregoing structures represents an adhesion-promoting layer which includes an adhesive, a laminated resin or a coextrudible adhesive resin. It could also be in effect an "untie layer", i.e., a layer that decreases the adhesion of backing layer 14 and sealing layer 12 when two adjoining sealing layers 12, 12' are ultrasonically-sealed.

What is claimed is:

1. A package seal which is ultrasonically-sealable and maintains a peelable seal feature, the peelable seal comprising:
   (a) a sealing layer of resin material which is ultrasonically-sealable, but is not readily heat-sealable,
   (b) a backing layer for the sealing layer, the backing layer being of a higher melting point resin than the sealing layer, the interlayer adhesion between the backing layer and the sealing layer being below the strength required to break the sealing layer.

2. A peelable package seal as in claim 1 further comprising at least one outer laminating layer.

3. The peelable package seal of claim 2 wherein said outer layer is a laminated layer.

4. The peelable package seal of claim 2 wherein said outer layer is a printed layer.

5. The peelable package seal of claim 2 wherein said outer layer is a coextruded layer.

6. The peelable package seal of claim 1 or 2 wherein the sealing layer resin is selected from the group consisting of: ionomer resins, nylon, polybutylene, polyester, high density polyethylene, medium density polyethylene, low density polyethylene, copolymers of ethylene and one or more materials selected from the group consisting of propylene, vinyl acetate, ethyl acrylate, methyl acrylate, acrylic acid, and vinyl alcohol, polypropylene, and polystyrene.

7. The peelable package seal of claim 1 or 2 wherein the sealing layer resin is a polymer, said polymer being treated with slip agents, jaw release chemicals or processing aids.

8. The peelable package seal of claim 1 or 2 wherein the backing layer resin is selected from the group consisting of: polyacrylonitrile, nylon, polycarbonate, polyester, high density polyethylene, medium density polyethylene, copolymers of ethylene and one or more materials selected from the group consisting of propylene, vinyl acetate, ethyl acrylate, methyl acrylate, acrylic acid, and vinyl alcohol, polypropylene, polystyrene and polyvinylidene chloride.

9. The peelable packge seal of claim 6 wherein the backing layer resin is selected from the group consisting of: polyacrylonitrile, nylon, polycarbonate, polyester, high density polyethylene, medium density polyethylene, copolymers of ethylene and one or more materials selected from the group consisting of propylene, vinyl acetate, ethyl acrylate, methyl acrylate, acrylic acid, and vinyl alcohol, propylene, polystyrene and polyvinylidene chloride.

10. The peelable package seal of claims 1 or 2 wherein the outer layer comprises polypropylene, ink, and low density polyethylene; the backing layer comprises nylon; and the sealing layer comprises high density polyethylene.

11. The peelable package seal of claims 1 or 2 wherein the outer layer comprises lacquer, ink, kraft paper and adhesive; the backing layer comprises polyester; and the sealing layer comprises polypropylene.

12. The peelable package seal of claims 1 or 2 wherein the outer layer comprises lacquer, ink, ethylene vinyl acetate, white high density polyethylene, brown high density polyethylene, and a tie; the backing layer comprises nylon; and the sealing layer comprises high density polyethylene.

13. The peelable package seal of claims 1 or 2 wherein the outer layer comprises high density polyethylene and a first tie; the backing layer comprises nylon; the sealing layer comprises high density polyethylene; and a second tie is disposed between the backing layer and the sealing layer, said second tie controls the adhesion of the backing layer and the sealing layer.

14. The peelable package seal of claims 1 or 2 wherein the sealing layer peels off from the backing layer when a pulling force is applied to one end of the package seal.

15. The peelable package seal of claims 1 or 2 wherein the seal strength ranges from 100 grams per inch to 1,800 grams per inch.

16. A peelable package seal comprising film-type packaging material which is sealed by ultrasonic techniques.

17. A peelable package seal comprising an end seal which is sealed by ultrasonic techniques.

* * * * *